United States Patent
Lim et al.

(10) Patent No.: US 8,369,907 B2
(45) Date of Patent: Feb. 5, 2013

(54) CASE FOR PORTABLE TERMINAL, PORTABLE TERMINAL HAVING THE SAME AND METHOD FOR MANUFACTURING THE SAME

(75) Inventors: Seung-Geun Lim, Seoul (KR); Jai-Joon Jeong, Seoul (KR); Jae-Woo Cho, Jinju (KR); Hyo-Sung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 670 days.

(21) Appl. No.: 12/425,660

(22) Filed: Apr. 17, 2009

(65) Prior Publication Data

US 2010/0056232 A1 Mar. 4, 2010

(30) Foreign Application Priority Data

Aug. 27, 2008 (KR) .................. 10-2008-0084139

(51) Int. Cl.
*H04M 1/00* (2006.01)

(52) U.S. Cl. .................... 455/575.1; 455/575.4

(58) Field of Classification Search ............. 455/575.1, 455/569.1, 575.8, 575.3, 575.4
See application file for complete search history.

(56) References Cited

U.S. PATENT DOCUMENTS

| | | | |
|---|---|---|---|
| 6,522,520 B2 | 2/2003 | Hashizume | |
| 6,667,795 B2 * | 12/2003 | Shigemura | 349/187 |
| 6,696,197 B2 * | 2/2004 | Inagaki et al. | 429/120 |
| 7,107,018 B2 * | 9/2006 | Jellicoe | 455/90.3 |
| 2002/0106952 A1 | 8/2002 | Hashizume et al. | |
| 2004/0204156 A1 * | 10/2004 | Tsai | 455/569.1 |
| 2007/0232371 A1 * | 10/2007 | Soekawa et al. | 455/575.5 |

OTHER PUBLICATIONS

Nokia 8800 Carbon Arte webpage; URL address: www.gsmarena.com/nokia_8800_carbon_arte-2493.php; one (1) page.
Thomas Ricker; Nokia's 8800 Carbon Arte luxury to the moon; URL address: http://www.engadget.com/2008/08/19/nokias-8800-carbon-arte-takes-luxury-to-the-moon/; Aug. 19, 2008; 2:58 A.M.; four (4) pages.

* cited by examiner

*Primary Examiner* — Peguy Jean Pierre
(74) *Attorney, Agent, or Firm* — Birch, Stewart, Kolasch & Birch, LLP (57) ABSTRACT

A case for a portable terminal includes a case body having a surface provided with a recessed area and a sheet formed of fibers, and is inserted into the recessed area so that end portions of the sheet is covered by the case body. The portable terminal includes the case. A method for manufacturing the case is also discussed.

21 Claims, 6 Drawing Sheets

CASE FOR PORTABLE TERMINAL, PORTABLE TERMINAL HAVING THE SAME AND METHOD FOR MANUFACTURING THE SAME

CROSS-REFERENCE TO RELATED APPLICATIONS

This application claims priority to Korean Application No. 10-2008-0084139, filed Aug. 27, 2008, which is herein incorporated by reference in its entirety.

BACKGROUND OF THE INVENTION

1. Field of the Invention

The present invention relates to a case for a portable terminal which has fibrous patterns, a portable terminal having the same and a method for manufacturing the same.

2. Description of the Related Art

Portable terminals can be easily carried and have one or more of functions such as supporting voice calls and video calls, inputting and/or outputting information, storing data and the like. As they become multifunctional, the portable terminals can be allowed to capture still images or moving pictures, play music or video files, support game playing, receive broadcast and the like, so as to be implemented as an integrated multimedia device.

Various attempts have been done to implement the portable terminals as the multimedia device by hardware or software in order to implement such complicated functions thereof. For example, a user interface environment is provided in order for users to easily and conveniently retrieve or select functions thereof.

Additionally, as the portable terminals are thought of as personal belongings for expressing one's individuality, various designs are required. The case of the portable terminals is also required to have various designs to fully express one's individuality.

SUMMARY OF THE INVENTION

Therefore, one object of the present invention is to provide a case for a portable terminal implementing another feel of a material different from that of a related art, a portable terminal having the same and a method for manufacturing the same.

Another object of the present invention is to improve durability with respect to coupling of the case for a portable terminal.

To achieve these and other advantages and in accordance with purposes of the present invention, as embodied and broadly described herein, there is provided a portable terminal comprising, a wireless communication module, an input device, a display device and a case for the portable terminal. The wireless communication module transmits/receives a radio signal. The input device is configured to input command for controlling the portable terminal. The display device displays image information for the portable terminal. The case for the portable terminal forms at least one portion of an external appearance of a main body of the portable terminal provided with the wireless communication module, the input device and the display device. The case for the portable terminal comprises a case body and a sheet. The case body has a surface provided with a recessed area. The sheet is formed of fibers and is inserted into the recessed area so that end portions thereof can be covered.

In one aspect of the present invention, the sheet is formed by weaving carbon fibers. The sheet may comprise a first group and a second group. The first group is configured with a plurality of carbon fibers disposed in one direction, and the second group is configured with a plurality of carbon fibers disposed in a direction intersecting with the one direction. The sheet is configured to have patterns in which the first group and the second group are repeatedly implemented by intersection of the first group and the second group.

In another aspect of the present invention, an outwardly exposed surface of the sheet is configured to be on the same plane with a peripheral area adjacent to the recessed area.

In still another aspect of the present invention, the sheet is provided with a protection layer configured to protect a surface of the sheet. The protection layer is formed of a paint having a light transmitting characteristic. The paint is hardened by a light irradiation. The sheet may be provided with a printing layer on at least one portion thereof.

In yet still another aspect of the present invention, the end portions are formed by cutting an edge area of a base sheet.

In yet still another aspect of the present invention, the case for the portable terminal is configured to cover a power supply unit configured to supply power to the main body.

In yet still another aspect of the present invention, a method for manufacturing a case for a portable terminal comprises forming a base sheet, forming a protection layer, forming a sheet and forming a case. The base sheet is formed of carbon fibers. The protection layer is configured to cover a surface of the base sheet. The sheet is formed by cutting an edge area of the base sheet. The sheet is mounted in a recessed area of a case body in the step of forming the case.

In yet still another aspect of the present invention, the step of forming the protection layer comprises injecting a light-transmitting paint and hardening the paint. The paint is injected onto the rotating base sheet.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate preferred embodiments of the invention and together with the description serve to explain the principles of the invention.

In the drawings.

DETAILED DESCRIPTION OF THE INVENTION

Description will now be given in detail of the embodiments of the present invention, examples of which are illustrated in the accompanying drawings. The same reference numerals are provided to the same parts of one embodiment as those of other embodiments, and thus their detailed explanation will be omitted. An expression in singular may refer to those in plural.

Figure 1:
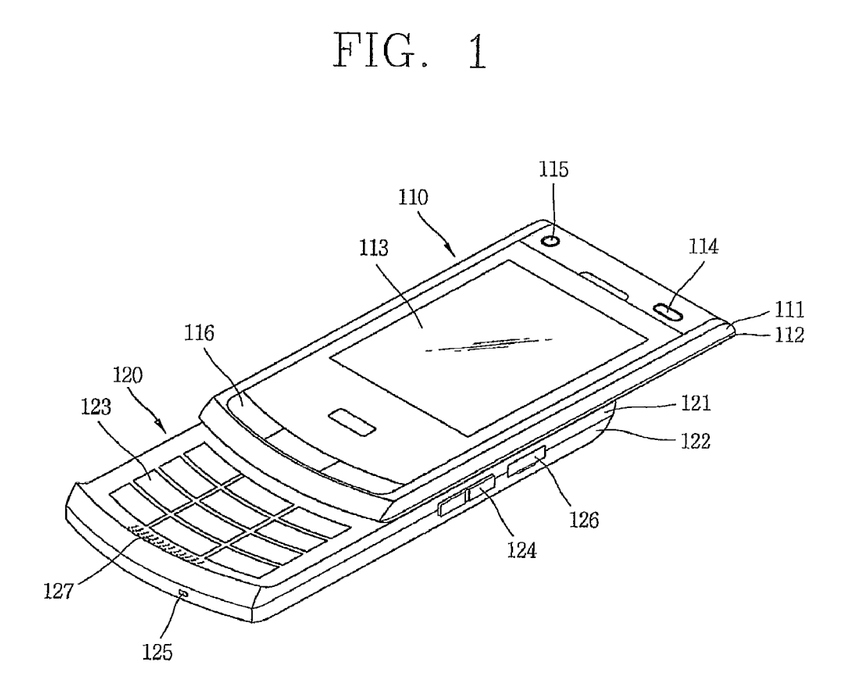
FIG. 1 is a perspective view showing a portable terminal in accordance with one exemplary embodiment of the present invention.

FIG. 1 is a perspective view showing a portable terminal in accordance with a one exemplary embodiment of the present invention. The portable terminal of the present invention includes a first body 110, and a second body 120 configured to be slidable with respect to the first body 110 in at least one direction. But, the portable terminal of the present invention is not limited thereto, but can be applied to various other types of the portable terminal, such as a bar type, a folder type, a swing type, and/or a swivel type, portable terminal.

A configuration of the portable terminal having the first body 110 being overlapped with the second body 120 may be referred to as a closed configuration (not shown), and a configuration of the portable terminal having at least one portion of the second body 120 being exposed by the first body 110 may be referred to as an open configuration as shown in the drawings.

In the closed configuration, the portable terminal may be mainly operated in a standby mode, but the standby mode may be released by a user's manipulation. In the open configuration, the portable terminal may be mainly operated in a call mode, but the call mode may be converted into the standby mode by the user's manipulation or after a certain time elapses.

A case (a casing, a housing, a cover, etc.) forming an external appearance of the first body 110 may be formed by a front case 111 and a rear case 112. Electronic components may be disposed in a space formed by the front case 111 and the rear case 112. At least one intermediate case may be additionally disposed between the front case 111 and the rear case 112 in one or more aspects of the present invention. The cases, such as cases 111 and 112, may be formed of a synthetic resin in a manner of injection, or formed of a metallic material such as stainless steel (STS) or titanium (Ti).

A display 113, an audio output unit 114, a first image input unit 115 or a first manipulation portion 116 may be disposed at the first body 110, particularly, at the front case 111. The display 113 includes a Liquid Crystal Display (LCD) module, an Organic Light Emitting Diodes (OLED) module, a Transparent OLED (TOLED), etc., to visually represent information for the portable terminal.

The display 113 may further include a touch screen so that the user can input information by touch. The display 113 may be formed to implement various tactile effects that can be felt by the user when the user touches the display 113, for example. The display 113 may be implemented by a haptic module interworking therewith. A representative tactile effect generated by the haptic module include vibration. The haptic module may be variously implemented according to configuration aspects of the portable terminal, as well as the display 113.

The audio output unit 114 may be implemented as a receiver or a speaker. The first image input unit 115 may be implemented as a camera module for shooting an image or a moving picture for the user. The first manipulation portion 116 is configured to receive a command for controlling an operation of the portable terminal related to embodiments of the present invention.

Like that of the first body 110, a case of the second body 120 may include a front case 121 and a rear case 122. The front cases 111, 121 and the rear cases 112, 122 may be referred to as a case for the portable terminal.

The second body 120, particularly, a front surface of the front case 121 may be provided with a second manipulation portion 123. At least one of the front case 121 and the rear case 122 may be provided with a third manipulation portion 124, a first audio input unit 125 and an interface 126.

The first to third manipulation portions 116, 123, 124 may be broadly referred to as a manipulation portion, which can be adapted or implemented in any manner, such as a tactile manner that the user can touch for manipulation.

For example, the manipulation portion may be implemented as a dome switch, the touch screen or a touch pad by which the user can input commands or information by push or touch thereof. Alternatively, the manipulation portion may be implemented, for example, as a wheel, a jog or a joystick.

Functionally, the first manipulation portion 116 is configured to input commands such as start, end, scroll or the like, and the second manipulation portion 123 is configured to input figures, letters, symbols or the like. Also, the third manipulation portion 124 can be worked as a hot key which performs a specific function, such as activating the first image input unit 115.

The first audio input unit 125 may be implemented, for example, as a microphone to receive user's voice or other sounds. The interface 126 serves as a path which allows the portable terminal related to the present invention to exchange data with external devices. For example, the interface 126 may be used in a wired or wireless manner, and may be at least one of a connection terminal to which an earphone is connected, a port for a local communication (e.g., infrared data (IrDA) port, Bluetooth port, wireless Lan port, etc.), or a power supply terminal for supplying power to the portable terminal. The interface 126 may be a card socket for receiving an external card such as a Subscriber Identification Module (SIM), a User Identity Module (UIM) or a memory card for storing information, etc.

A second audio output unit 127 may be additionally disposed at the front case 121. The second audio output unit 127 may be implemented as a stereo together with the first audio output unit 114 or may be used to talk in a speakerphone mode.

Figure 2:
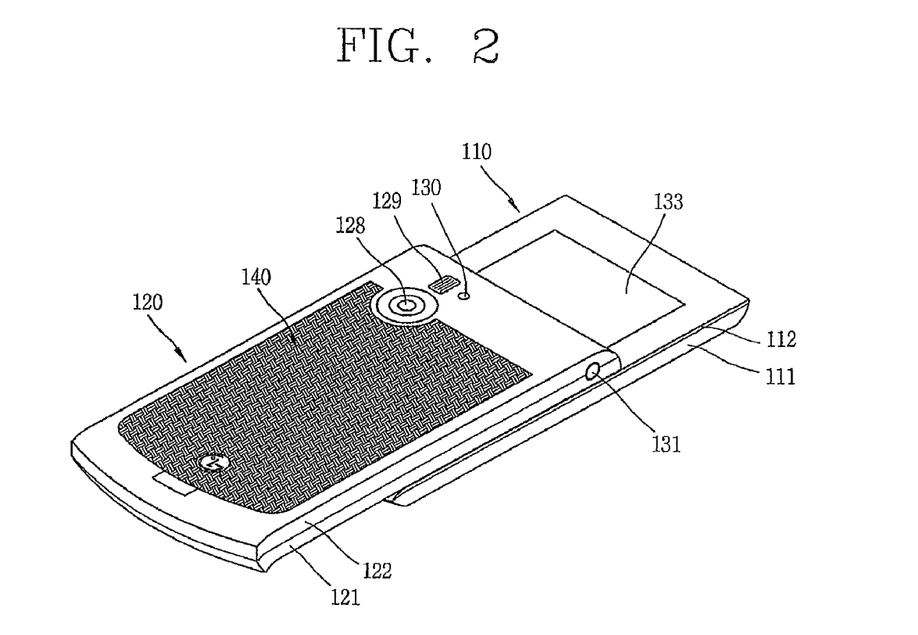
FIG. 2 is a rear perspective view showing the portable terminal of FIG. 1.

FIG. 2 is a rear perspective view showing the portable terminal of FIG. 1. Referring to FIG. 2, a second image input unit 128 may be additionally disposed at a rear surface of the rear case 122 of the second body 120. The second image input unit 128 has a shooting direction substantially opposite to a direction of the first image input unit 115 (see FIG. 1). The second image input unit 128 may be implemented as a camera having a pixel density different from that of the first image input unit.

For example, the first image input unit 115 has low pixel density so that an image of the user's face can be captured and then transmitted without any problem in case of a video call, while the second image input unit 128 has high pixel density since it is mainly used for a case an image of a general object is captured but the image is not immediately transmitted.

A flash 129 and a mirror portion 130 may be additionally disposed adjacent to the second image input unit 128. When capturing an object by using the second image input unit 128, the flash 129 throws a flash of light on the object. When the user captures an image of himself/herself by using the second image input unit 128, the mirror portion 130 can be used for the user to look at himself/herself therein.

At least one side of the front case 121 and the rear case 122 may be provided with an antenna 131 for receiving broadcast signals in addition to an antenna for communication. The antenna 131 may be installed to be extendable from the second body 120.

One portion of a slide module 133 by which the first body 110 and the second body 120 are slidably coupled to each other is disposed at the rear case 112 of the first body 110. Another portion of the slide module 133 is disposed at the front case 121 of the second terminal body 120, and may not be outwardly exposed as is shown in the drawing.

So far, it is explained that the second image input unit 128 is disposed at the second body 120. However, such is not limited thereto. For example, it is possible to mount at least one of components 128 to 131 disposed at the rear case 122, such as the second image input unit 128, to the first body 110, and particularly, to the rear case 112 thereof. In this case, it is advantageous that the component(s) disposed at the rear case 112 is protected by the second body 120 under a closed state. Further, even if the second image input unit 128 is not provided, since the first image input unit 115 is rotatably formed, it may be configured to be capable of shooting in a direction that includes a shooting direction of the second image input unit 128.

A power supply unit 132 (see FIG. 10) is mounted at the rear case side 122 so as to supply power to the portable terminal.

Figure 3:
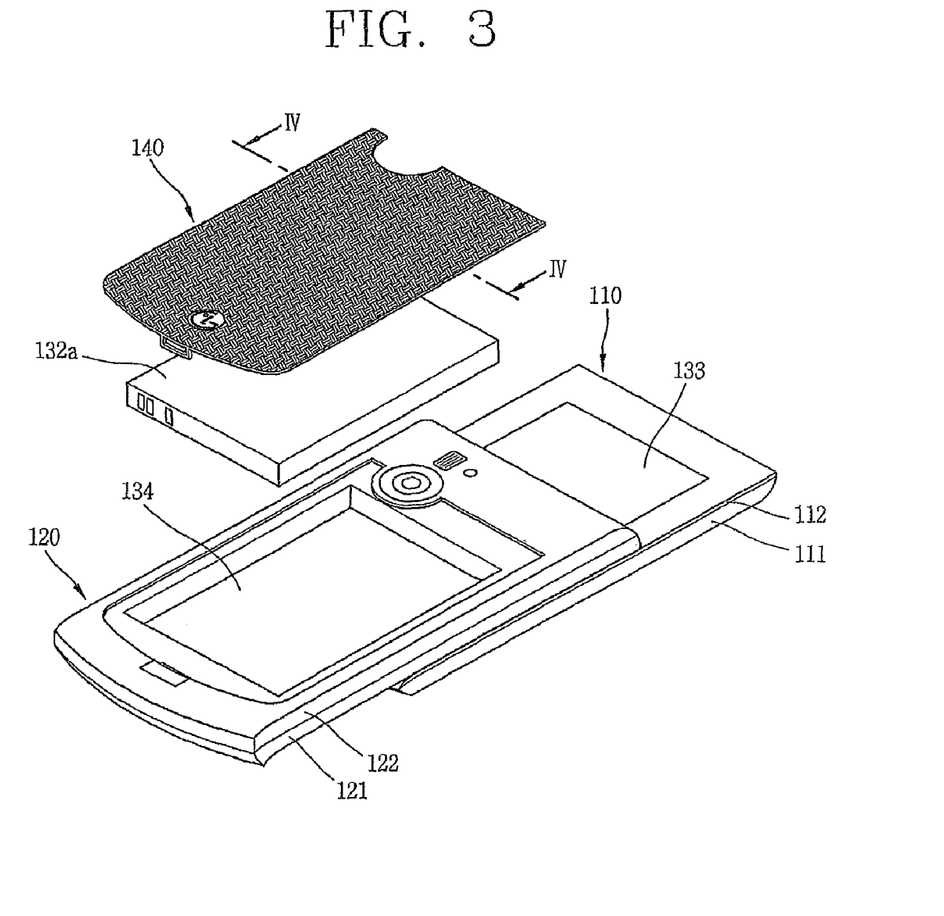
FIG. 3 is an exploded view showing a power supply unit in FIG. 2.

FIG. 3 is an exploded view showing a power supply unit in FIG. 2. The power supply unit 132 may be implemented as a rechargeable battery 132a, for example, and be detachably coupled to the portable terminal for charging and discharging operations. The power supply unit 132 mounted in the portable terminal may be covered with a power supply unit case 140. The power supply unit case 140 is included in the case for the portable terminal.

Referring to FIG. 3, the rear case 122 is provided with a receiving unit 134 recessed to receive the battery 132a. A connection terminal connected to the battery 132a may be installed at the receiving unit 134 to supply electricity to at least one component of the portable terminal. In covering the battery 132a, the power supply unit case 140 is coupled to the rear case 122.

Figure 4:
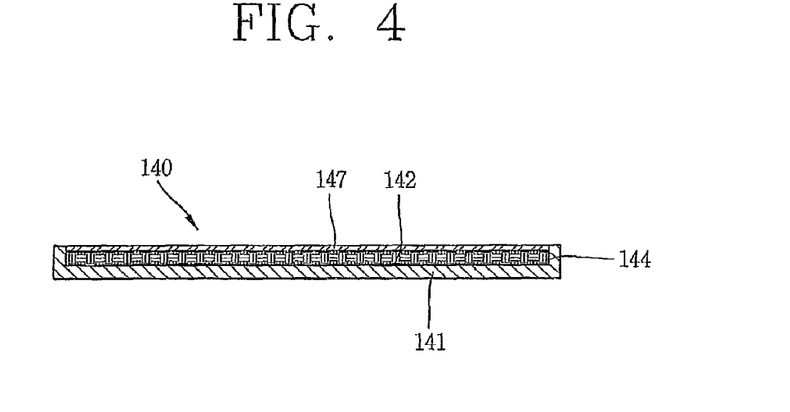
FIG. 4 is a section view showing a power supply unit case taken along line IV-IV in FIG. 3.
Figure 5:
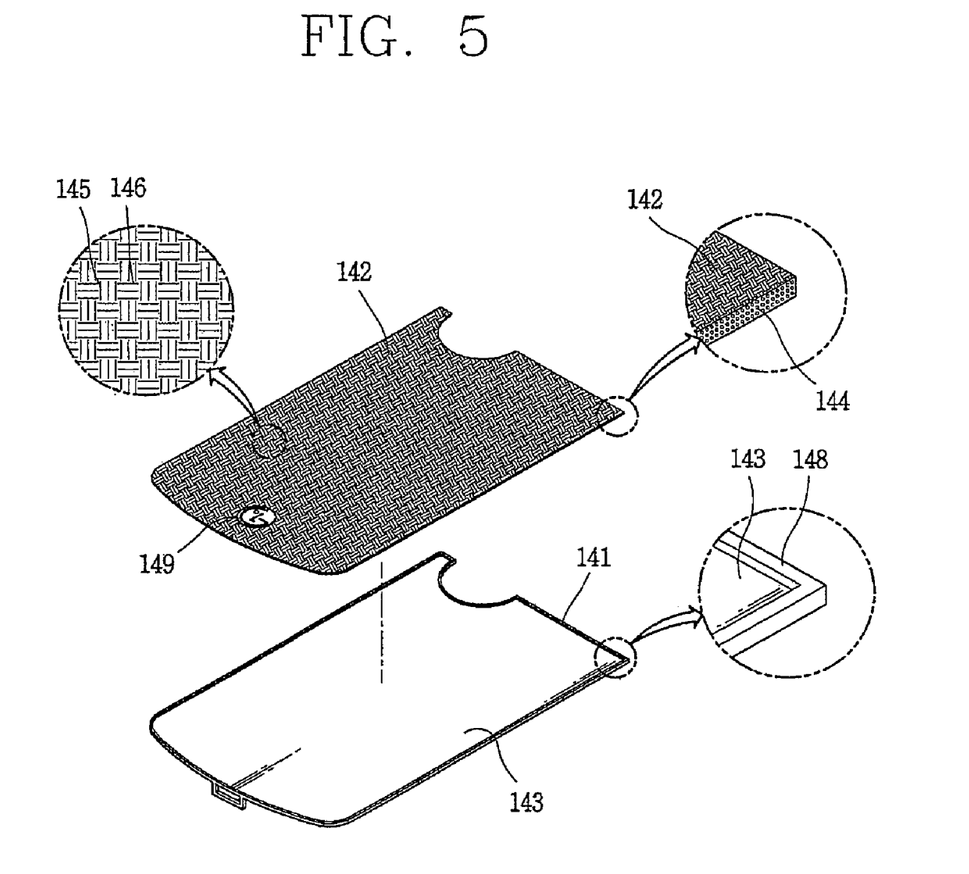
FIG. 5 is an exploded view showing the power supply unit case of FIG. 3.

FIG. 4 is a section view showing the power supply unit case 140 taken along line IV-IV in FIG. 3, and FIG. 5 is an exploded view showing the power supply unit case 140 in FIG. 3. The power supply unit case 140 includes a case body 141 and a sheet 142. A recessed area 143 is formed at an outer surface of the case body 141. The sheet 142 is formed of fibers and is mounted in the recessed area 143 by a double-sided tape or an adhesive agent, for example. Hereafter, the sheet 142 is explained on the basis of an embodiment in which the sheet 142 is applied to the power supply unit case 140, but the sheet 142 can be broadly applied to various cases for the portable terminal.

The sheet 142 is inserted into the recessed area 143 so that end portions 144 of the sheet 142 can be covered, for example, by the case body. Accordingly, the case body 141 and the sheet 142 can be formed to have an integrated external appearance.

Even if a shear force is applied to a coupled surface of the case 141 and the sheet 142 from the outside thereof, the sheet 142 is supported by a step height formed by the recessed area 143 and an adjacent area 148 of the case body 141, thereby enhancing durability with respect to the coupling of the case body 141 and the sheet 142. The adjacent area 148 is formed at the periphery of the case body 141. The sheet 142 may be formed of a fiber, for example, a carbon fiber or a glass fiber. Referring to the drawings, the sheet 142 is formed by weaving carbon fibers.

The end portions 144 of the sheet 142 may be formed to be rough. The fiber strands of the sheet 142 may be exposed at the end portions 144. As the sheet 142 is inserted into the recessed area 143, the rough surfaces of the end portions or the fiber strands may be covered, and may not be exposed. Since the carbon fiber has excellent strength compared with that of a synthetic resin, the power supply unit case 140 configured to have the integrated appearance can be slimmer than a case of the related art.

The sheet 142 may include fibers of first and second groups 145, 146. In the first group 145, a plurality of carbon fibers are disposed in one direction. In the second group 146, a plurality of carbon fibers are disposed in a direction intersecting with the one direction. The sheet 142 is formed by weaving the first and second groups 145, 146 to intersect with each other. Accordingly, patterns in which the first and second groups 145, 146 are repeatedly weaved are formed on the sheet 142.

The weaved carbon fibers may be in one color so as to form the sheet 142 of the one color. However, the color of the carbon fiber is not limited thereto just one, but the carbon fibers of the first and second groups 145, 146 can be implemented as other colors different from those of each other.

By the sheet 142 formed of the fiber, the power supply unit case 140 is implemented to have a different material feel from that of the related art.

The sheet 142 is provided with a protection layer 147 for covering a surface of the sheet 142. The protection layer 147 serves to protect the sheet 142 from an external impact. The protection layer 147 is formed of a paint having a light transmitting characteristic. The light-transmittable paint has a thickness on the surface of the sheet 142. Accordingly, a depth is added to the patterns formed on the sheet 142. The protection layer 147 is hardened by a light irradiation, for example, ultraviolet rays. Here, the hardening of the protection layer 147 is not limited thereto, but can be implemented by other manners such as by thermosetting.

A printing layer 149 is printed on at least one portion of the sheet 142. For example, the printing layer 149 may be implemented as a character, a figure, a symbol or a logo on the sheet 142. In embodiments of present invention, the printing layer may be implemented by an impression or other markings formed in the sheet 142 or in the protection layer 147.

An outwardly exposed surface of the sheet 142 may be configured to be on the same plane with the area 148 adjacent to the recessed area 143, or peripheral thereto. To this end, the sheet 142 has a thickness not to be protruded from the surface of the sheet 142 of the area 148 adjacent to the protection layer 147 formed on the sheet 142. Accordingly, the end portions 144 of the sheet 142 may not be completely exposed. In embodiments of the present invention, the area 148 may be raised areas of the case body 141.

Figure 6A:
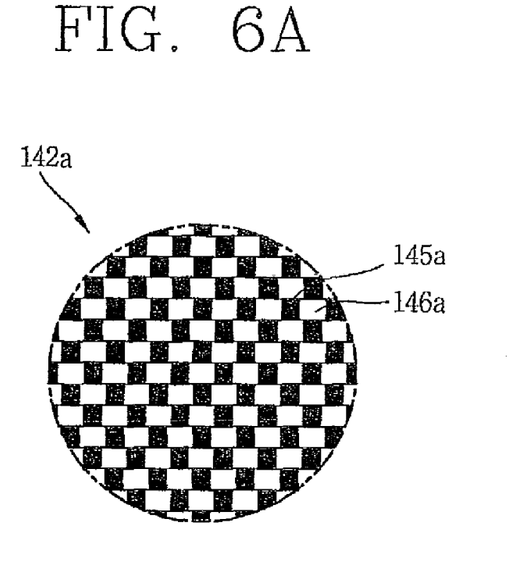
FIGS. 6A and 6B are concept views showing variations of patterns implemented on a sheet of FIG. 5.
Figure 6B:
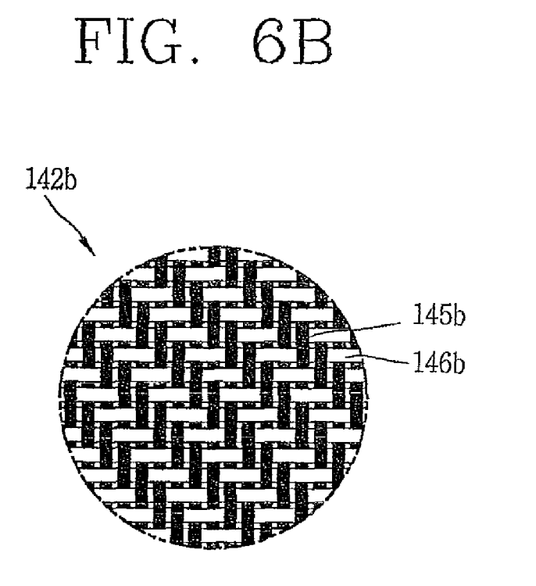

FIGS. 6A and 6B are concept views respectively showing variations of patterns implemented on the sheet 142 of FIG. 5. Referring to FIG. 6A, a sheet 142a may have patterns repeatedly formed in horizontal and vertical directions resulting from each of carbon fiber groups 145a, 146a being weaved to be uniformly repeated.

Referring to FIG. 6B, a sheet 142b may have patterns having directivity. As one example thereof, the directivity may be implemented in patterns differently viewed according to a user's viewpoint. As shown, the user may feel that a vertically longer fiber group 145b is obliquely formed or feel that a horizontally longer fiber group 146b is obliquely formed.

Figure 7:
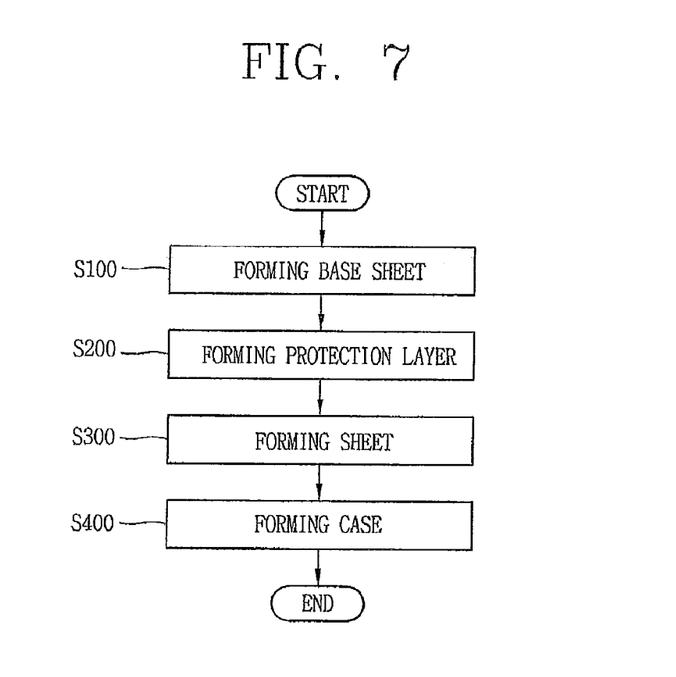
FIG. 7 is a flow chart showing a method for manufacturing a case for a portable terminal in accordance with the present invention.

FIG. 7 is a flow chart showing a method for manufacturing a case for a portable terminal in accordance with the present invention. The manufacturing method includes forming a base sheet (S100), forming a protection layer (S200), forming a sheet (S300) and forming a case (S400).

In the step of forming a base sheet (S100), the base sheet is formed by the carbon fibers. The base sheet is formed by weaving the carbon fibers. After weaving the carbon fibers, when a epoxy resin, for example, is infiltrated into gaps between the fibers, a stiffness of the base sheet can be enhanced.

In the step of forming a protection layer (S200), a protection layer is formed to protect the surface of the base sheet. The step of forming the protection layer may include a step of injecting a paint and a step of hardening the paint. The base sheet is rotated in the step of injecting the paint. Accordingly, the surface of the base sheet can be uniformly coated with the paint. The paint is injected to the base sheet at one side of the base sheet. The paint may be hardened by light hardening manner or by thermosetting. As one example, the light hardening may be implemented by hardening the paint by irradiating the paint with ultraviolet rays.

The paint may have a color. Accordingly, the case for the portable terminal may have a color different from a color of the carbon fiber itself, for example, by additionally forming a light transmitting color layer on the protection layer, so that the case for the portable terminal may have a color of the color layer.

In the step of forming a sheet (S300), a sheet is formed by cutting an edge area of the base sheet. The paint injected onto the rotating base sheet may be concentrated at the edge area of the base sheet due to a centrifugal force of the rotating base sheet. By cutting the edge area of the base sheet, the surface of the protection layer may be entirely level. In the step of forming a case (S400), a case is formed by mounting the sheet in the recessed area of the case body.

Figure 8:
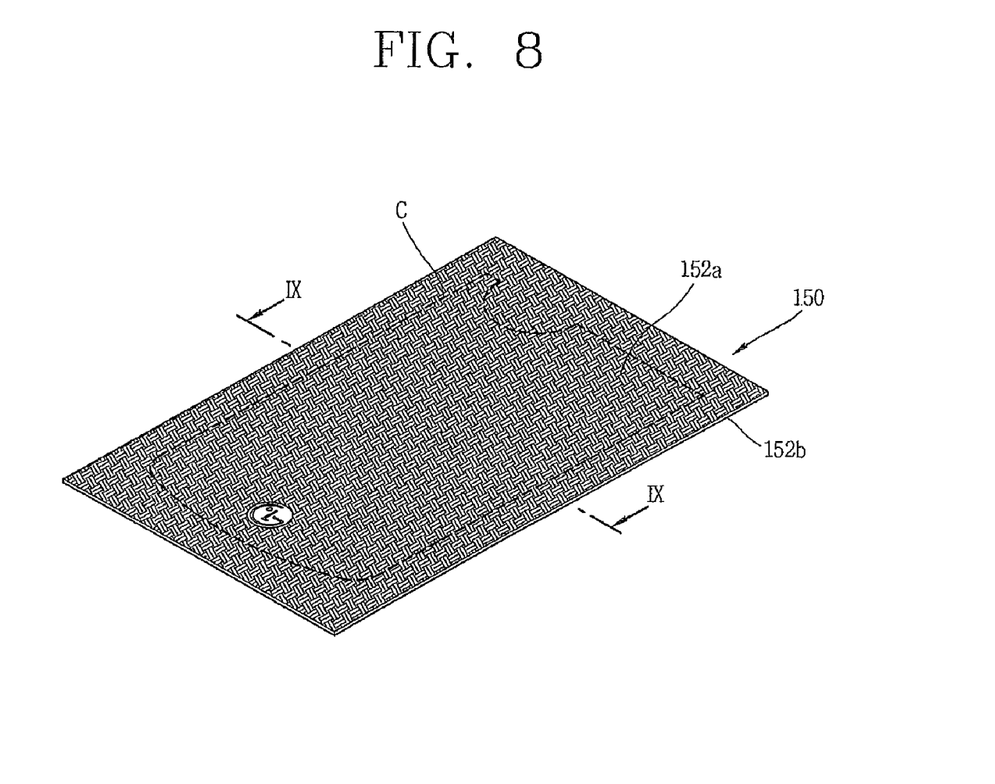
FIG. 8 is a perspective view showing a base sheet used for the manufacturing method of FIG. 7.
Figure 9:
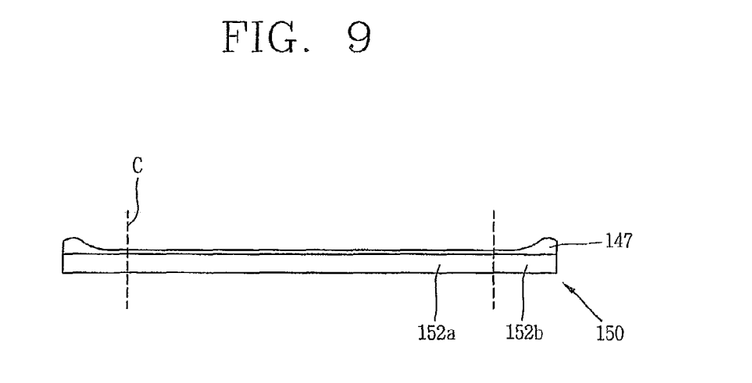
FIG. 9 is a section view showing the base sheet taken along line IX-IX in FIG. 8.

FIG. 8 is a perspective view showing the base sheet 150 used for the manufacturing method of FIG. 7, and FIG. 9 is a section view showing the base sheet 150 taken along line IX-IX in FIG. 8. The base sheet 150 may include a central area 152a corresponding to the sheet 140 (see FIG. 5). The central area 152a may be encompassed by an edge area 152b. When the paint for forming the protection layer is applied to the base sheet 150, the paint is concentratingly distributed on the central area 152a rather than the edge area 152b to take advantage of the centrifugal force. The paint for forming the protection layer is then concentratingly distributed on the edge area 152b rather than the central area 152a due to the centrifugal force.

The edge area 152b is cut on the basis of a cutting line (C) set to correspond to a size of the recessed area 143 (see FIG. 5) by a manner of numerical control (NC) process, for example. As such, by cutting the edge area 152b of the base sheet 150, the end portions 144 (see FIG. 4) of the sheet 140 are formed.

Figure 10:
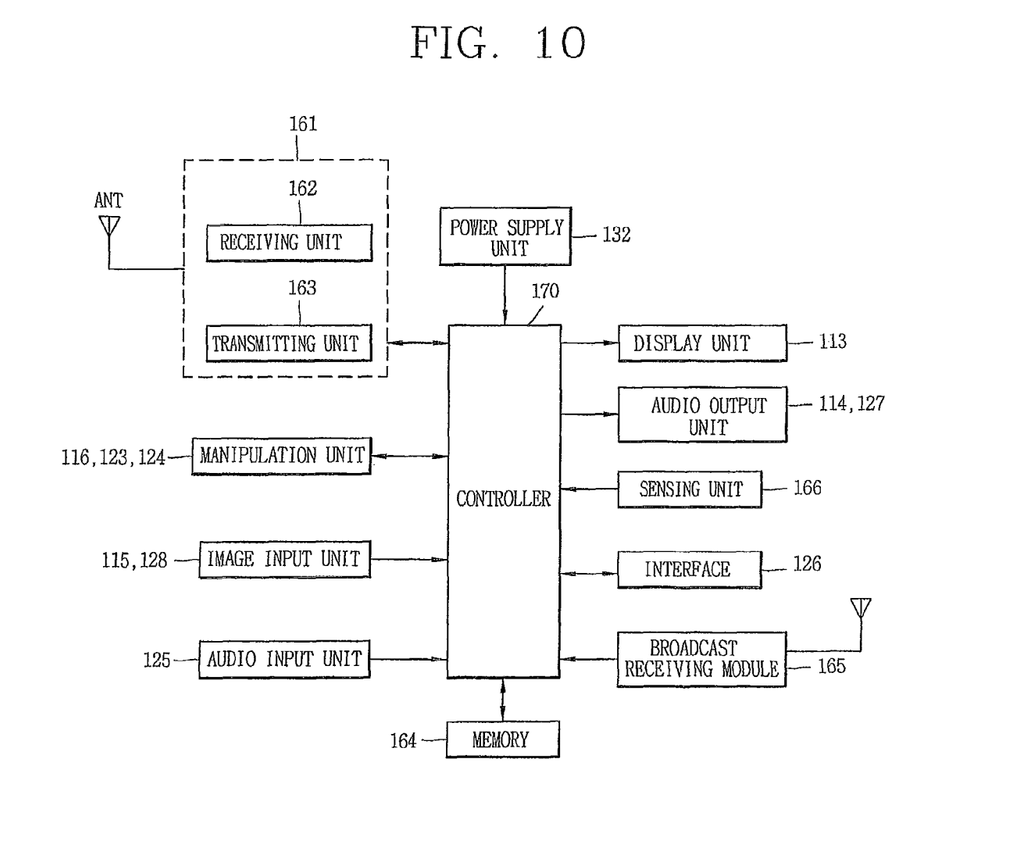
FIG. 10 is a block diagram showing a portable terminal in accordance with the present invention.

FIG. 10 is a block diagram showing a portable terminal in accordance with the present invention. Referring to FIG. 10, the portable terminal in accordance with the one exemplary embodiment of the present invention includes a wireless communication module 161, manipulation portions 116, 123, 124, image input units 115, 128, the audio input unit 125, the display 113, the audio output units 114, 127, a sensing unit 166, the interface 126, a broadcast receiving module 165, a memory 164, the power supply unit 132 and a controller 170.

The controller 170 generally serves to control over all operations of the portable terminal, for example, controlling and processing related to a voice call, a data communication, a video call, etc. In addition, the controller 170 controls an operation of the portable terminal related to the present invention in addition to the general function control.

The wireless communication module 161 transmits/receives a radio (wireless) signal to/from a mobile communication base station via an antenna (ANT). For example, the wireless communication module 161 serves to transmit/receive voice data, character data, image data and control data under control of the controller 170, and includes a transmitting unit 162 modulating a signal to be transmitted and transmitting it and a receiving unit 163 demodulating the received signal.

The manipulation portions 116, 123, 124 are configured as shown in FIG. 1 and provide the controller 170 with key input data inputted to control the operations of the portable terminal 1 by the user. The manipulation portions 116, 123, 124 may be implemented as the dome switch, the touch pad (static pressure/capacitance), a jog wheel or a jog switch.

The image input units 115, 128 process a video frame such as still images or moving pictures obtained by an image sensor in a video call mode or shooting mode. And, the processed video frame is converted into image data that can be displayed on the display 113 and outputted through the display 113. The video frame processed by the image input units 115, 128 is stored in the memory 164 under control of the controller 170 or outwardly transmitted through the wireless communication module 161.

The audio input unit 125 receives an external audio signal through a microphone in the call mode, the recording mode or the voice recognition mode, and processes the signal into electric voice data. In the call mode, the processed voice data is converted into a transmittable format and directed toward the mobile communication base station through the wireless communication module 161, and then outputted to the wireless communication module. In the recording mode, the processed voice data is outputted to be stored in the memory 164. The audio input unit 125 may implement various noise reduction algorithms for reducing noise generated in a process for inputting the external audio signal.

The display 113 outputs information processed in the portable terminal. For example, in case that the portable terminal is in the call mode, a User Interface (UI) or Graphic User Interface (GUI) related to the calling is outputted under control of the controller 170. In case that the portable terminal is in the video call mode or shooting mode, the shot image or UI or GUI is outputted under control of the controller 70. When including the touch screen, the display 113 is used as an input device as well as the output device.

The audio output units 114, 127 convert audio data received from the wireless communication module 161 or audio data stored in the memory 164, and outwardly output the audio data under control of the controller 170 in a call signal receiving mode, the call mode, the recording mode, the voice recognition mode or the broadcast receiving mode. Also, the audio output units 114, 127 output an audio signal related to functions executed in the portable terminal (e.g., call signal receive sound, message receive sound, etc.). The audio output units 114, 127 include a speaker, a receiver, a buzzer, etc.

The sensing unit 166 senses a current status of the portable terminal such as an open/closed status of the portable terminal, a position of the portable terminal, whether or not a user contacts the portable terminal, and then generates a sensing signal for controlling the operations of the portable terminal.

For example, in case that the portable terminal is implemented as a slide phone, the sensing unit 166 senses whether or not the slide phone is open and outputs the sensing result to the controller 170, so that the operations of the portable terminal are controlled. Also, the sensing unit 166 serves to sense whether or not the power supply unit 132 supplies the power, whether or not the interface 126 is coupled to an external device, etc.

The interface 126 serves as an interface with all external devices connected thereto, such as a wire/wireless headset, an external charger, a wire/wireless data port, a card socket (e.g., memory card, SIM/UIM card), etc. Such interface 126 allows the data or power transmitted or supplied from the external device to be transferred to each component inside of the portable terminal, or the data inside of the portable terminal to be transmitted to the external device.

In the memory 164, a program for processing and controlling the controller 170 may be stored therein, or the inputted/outputted data (e.g., phonebook, message, still image, moving picture, etc.) may be temporally stored therein. The memory 164 stores a program for controlling the operation of the portable terminal related to the present invention. Such memory 164 may be implemented as a hard disk, a card-type memory (e.g., SD, XD memory etc.), a flash memory, a RAM, a ROM, etc.

The broadcast receiving module 165 serves to receive a broadcast signal transmitted through a satellite wave or a ground wave, and outputs the broadcast signal to the controller 170 by converting the broadcast signal into a broadcast data format that can be outputted to the audio output units 114, 127 and the display 113. Also, the broadcast receiving module 165 receives additional data (e.g., EPG (Electric Program Guide), channel list, etc.) related to the broadcasting. The additional data and the broadcast data converted by the broadcast receiving module 165 may be stored in the memory 164.

The power supply unit 132 is applied with an external or internal power under control of the controller 170, and supplies power required for the operation of each component of the portable terminal.

As aforementioned, embodiments of the present invention is capable of implementing a case for a portable terminal that implements a different material feel different from that of the related art by the sheet formed of the fiber, and a portable terminal having the same.

The present invention provides the case for the portable terminal having an integrated appearance resulting from the end portions of the sheet not being exposed from the recessed area. The present invention provides the case for the portable terminal having a greater durability with respect to the coupling of the sheet and the case body resulting from the sheet being inserted into the recessed area of the case body.

The present invention provides the case for the portable terminal configured to be slim, yet having structural strength by using the carbon fiber.

The present invention provides the case for the portable terminal having the protection layer in which the surface thereof is level resulting from cutting the edge area of the base sheet.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present inventive features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal comprising:
   a wireless communication module configured to transmit/receive a radio signal;
   an input device by which commands for controlling the portable terminal is inputted;
   a display device configured to display image information for the portable terminal; and
   a case configured to form at least one portion of an external appearance of a body of the portable terminal provided with the wireless communication module, the input device and the display device,
   wherein the case comprises:
      a case body having an outer surface, a recessed portion formed at the outer surface such that the outer surface provides a perimeter around the recessed portion; and
      a sheet formed of fibers disposed at the recessed portion such that at least a portion of the sheet is supported from below by the recessed portion, the sheet including:
         a first group in which a plurality of fibers are disposed in one direction; and
         a second group in which the plurality of fibers are disposed in a direction intersecting with the one direction.

2. The portable terminal of claim 1, wherein the sheet is formed by weaving carbon fibers.

3. The portable terminal of claim 1, wherein the sheet further includes patterns exposed outwardly from the body of the portable terminal, the patterns being implemented by repeated intersection of the first group and the second group.

4. The portable terminal of claim 1, wherein an outwardly exposed surface of the sheet is configured to be on the same plane with the perimeter around the recessed portion.

5. The portable terminal of claim 1, wherein the sheet is provided with a protection layer configured to protect a surface of the sheet.

6. The portable terminal of claim 5, wherein the protection layer is formed of a paint hardened by a light irradiation, and having a light transmitting characteristic.

7. The portable terminal of claim 1, wherein the end portions are formed by cutting an edge area of a base sheet from which the sheet is made.

8. The portable terminal of claim 1, wherein the sheet is provided with a printing layer on at least one portion thereof.

9. The portable terminal of claim 1, wherein the case is configured to cover a power supply unit configured to supply power to the body of the portable terminal.

10. The portable terminal of claim 9, where the case body forms a battery cover.

11. The portable terminal of claim 1, wherein a pattern is formed by the crossing of the first and second groups, a portion of the pattern formed by the first group extends in a longitudinal direction of the body, and a portion of the pattern formed by the second group extends in a transverse direction of the body.

12. The portable terminal of claim 1, wherein the case body has a pair of opposing sides and the sheet has a pair of sides extending substantially parallel to the pair of opposing sides of the case body.

13. The portable terminal of claim 1, wherein the sheet has a pair of sides extending parallel to each other and an upper side connecting the pair of sides, the upper side being located adjacent an image input unit.

14. A portable terminal comprising:
a body;
a wireless communication module configured to transmit/receive a radio signal;
a display device configured to display image information for the portable terminal and disposed at a front surface of the body;
a receiving unit recessed from the body to receive a power supply unit; and
a power supply unit case configured to cover the power supply unit and the receiving unit, the power supply unit case including:
  a case body having an outer surface; and
  a sheet formed of fibers mounted at the outer surface of the case body, the sheet having a pair of sides extending parallel to each other, an upper side connecting the pair of sides, and a curved lower side connecting the pair of sides, the sheet including:
    a first group in which a plurality of fibers are disposed in one direction; and
    a second group in which the plurality of fibers are disposed in a direction crossing the one direction,
    wherein the curved lower side has a larger radius of curvature at the middle of the curved lower side than at both ends thereof where the curved lower side is connected to the pair of sides.

15. The portable terminal of claim 14, wherein the sheet is formed by weaving carbon fibers.

16. The portable terminal of claim 14, wherein the sheet is provided with a protection layer for protecting a surface of the sheet.

17. The portable terminal of claim 14, wherein the end portions are formed by cutting an edge area of a base sheet from which the sheet is made.

18. The portable terminal of claim 14, wherein the sheet is provided with a printing layer on at least one portion thereof.

19. The portable terminal of claim 14, wherein the curved upper side is located adjacent an image input unit.

20. The portable terminal of claim 19, wherein the receiving unit and an image input unit are provided on the same surface of the body.

21. The portable terminal of claim 14, wherein a pattern is formed by the crossing of the first and second groups, a portion of the pattern formed by the first group extends in a longitudinal direction of the body, and a portion of the pattern formed by the second group extends in a transverse direction of the body.

* * * * *